B. D. JONES.
CAR STRUCTURE.
APPLICATION FILED JULY 1, 1912.
1,066,908.
Patented July 8, 1913.
2 SHEETS—SHEET 1.
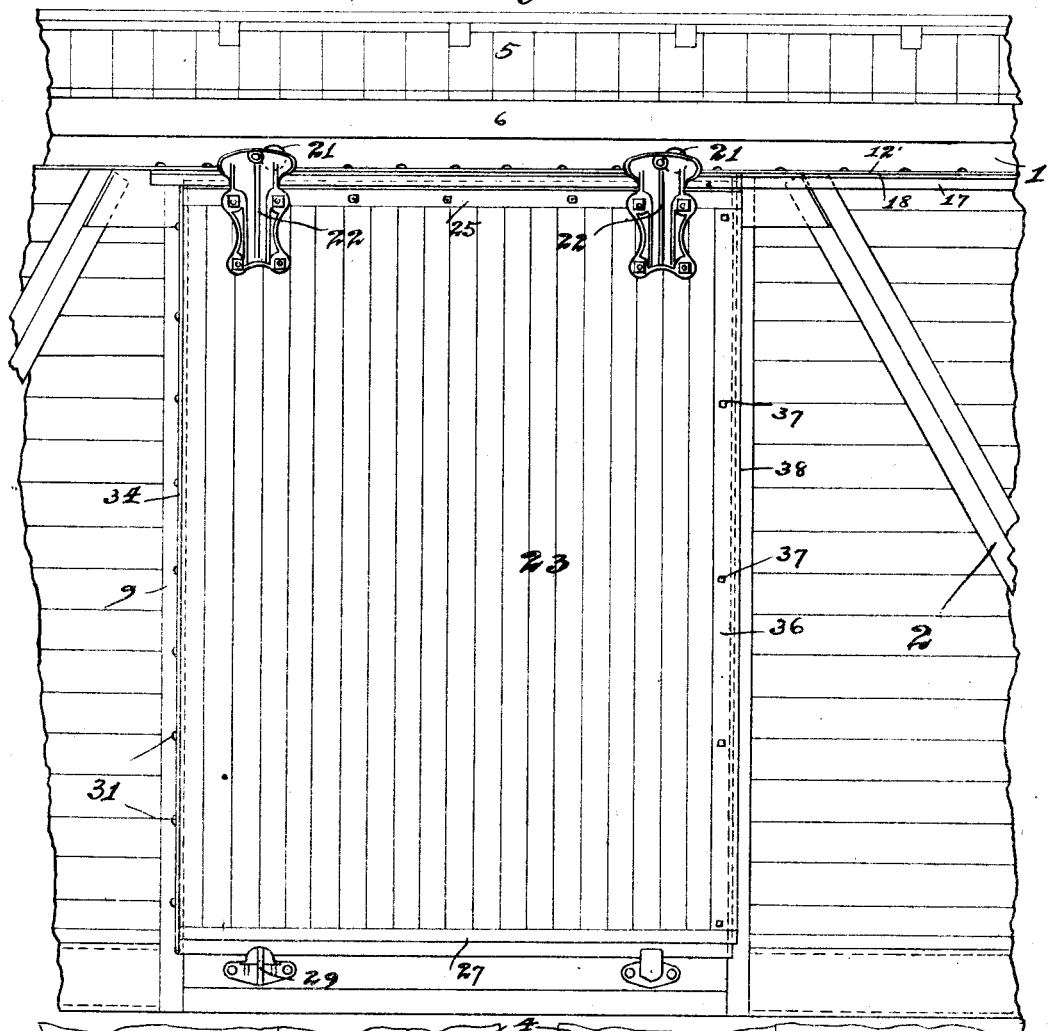
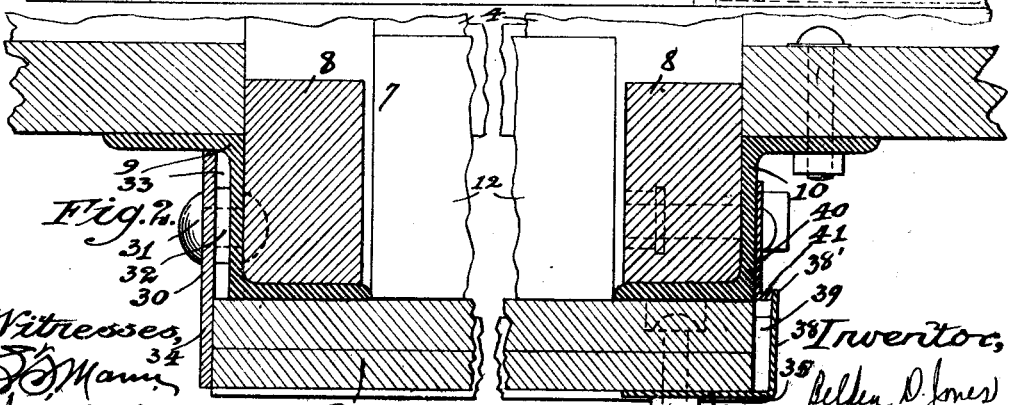

B. D. JONES.
CAR STRUCTURE.
APPLICATION FILED JULY 1, 1912.
1,066,908.
Patented July 8, 1913.
2 SHEETS—SHEET 2
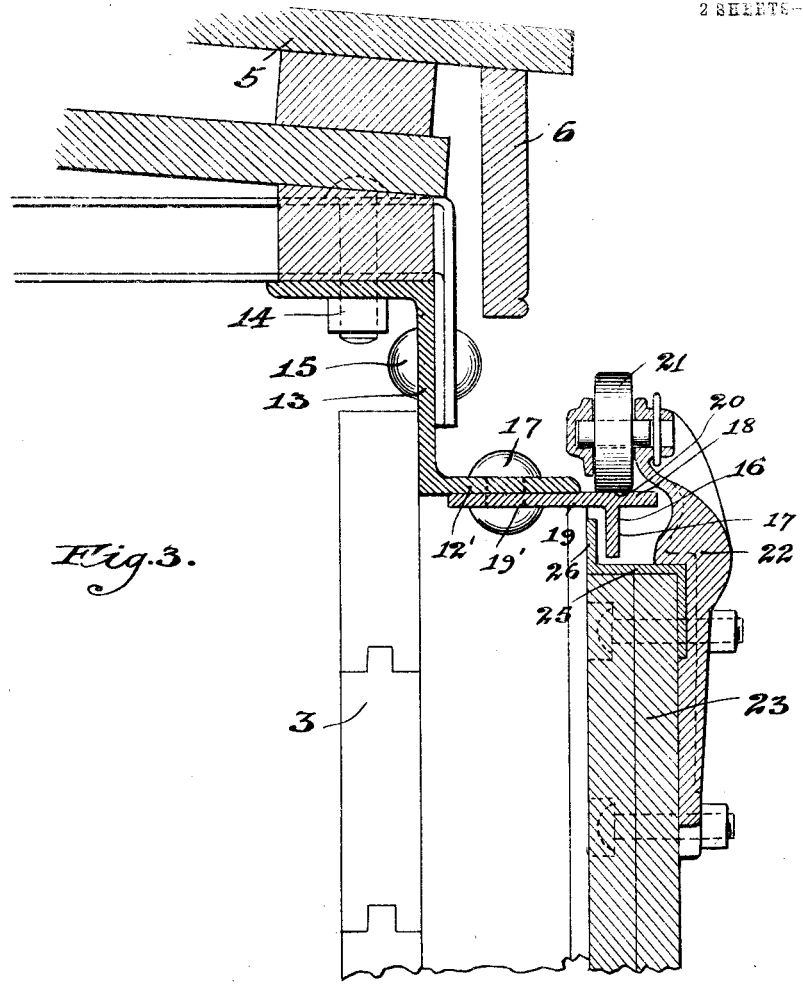
Fig. 3.
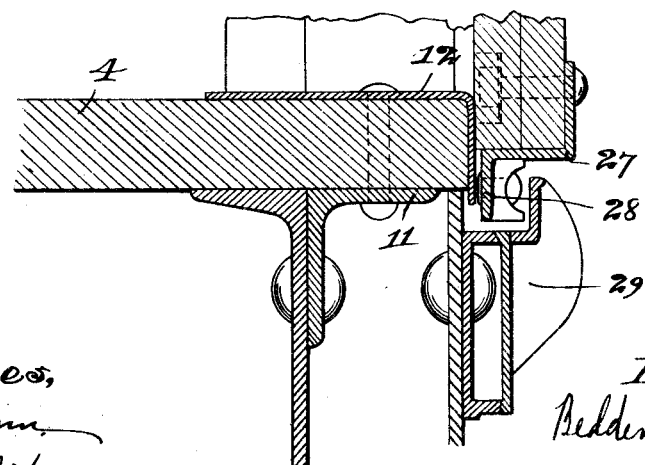
Witnesses,
S. D. Mann
Joyce M. Lutz
Inventor,
Bedden D. Jones
By Offield Towle Graves & Offield
Attys.

UNITED STATES PATENT OFFICE.

BELDEN D. JONES, OF CHICAGO, ILLINOIS, ASSIGNOR TO THE JONES CAR DOOR COMPANY, OF CHICAGO, ILLINOIS, A CORPORATION OF MAINE.

CAR STRUCTURE.

1,066,908.  Specification of Letters Patent.  Patented July 8, 1913.

Application filed July 1, 1912. Serial No. 706,968.

*To all whom it may concern:*

Be it known that I, BELDEN D. JONES, a citizen of the United States, residing in the city of Chicago, county of Cook, and State of Illinois, have invented certain new and useful Improvements in Car Structures, of which the following is a specification.

This invention relates to improvements in car structures and refers more particularly to improvements in freight car door structures and the manner of supporting the same.

The salient object of the invention is to provide an improved and novel form of supporting and confining the sliding car-door, the construction being particularly adapted for use with that type of freight car having a steel or sheet-metal outer facing.

Other objects of the invention are to provide a construction of the character referred to which insures of the track wheels being at all times properly confined on the trackway and at the same time permits a free and unconfined movement of the door as it is moved into open or closed position; to provide a construction which insures of a weather-proof joint at the upper end of the car door opening; to provide a construction of the character referred to of an improved form of combined weather guard and door stop; to provide a construction which is particularly characterized by its simplicity and economy of manufacture; and in general to provide an improved construction of the character referred to.

In the drawings—Figure 1 is a fragmentary side elevation of a freight car equipped with my invention; Fig. 2 is a fragmentary horizontal sectional view on an enlarged scale, the parts being further broken away to reduce the size of the drawing; and Fig. 3 is a fragmentary vertical sectional view of the car, the parts being broken away to reduce the size of the drawing.

The invention consists in the matters hereinafter described and more particularly pointed out in the appended claims.

Referring to the drawings,—1 designates as a whole a freight car provided with an outer steel frame 2, inner wooden sheathing 3, floor 4, roofing 5, the latter having the usual facing 6.

7 designates the door opening, 8 the wooden door posts, and 9 and 10 the steel posts, which, as shown, take the form of commercial rolled Z-bars securely fastened to the frame of the car body.

The sill member 11 supports the outer end of the flooring 4, and to the latter is riveted or otherwise secured a steel facing 12, which forms the lower edge of the door-opening. The upper end or top rail 12' of the car door opening is formed by the lower flange of a commercial rolled Z-bar 13, which is secured, as shown at 14 and 15, to the frame.

As an important feature of the invention, a novel form of track member is provided which also serves the function of confining the door structure in place, and in addition forms a weather proof fit at the upper end of the car door opening. To the above ends, a generally T shaped sheet metal member 16 is riveted or otherwise secured, as shown at 17, to the top rail 12' of the Z-bar 13. As shown more clearly in Fig. 3, this member 16 comprises a vertical leg portion 17, horizontal arms 18 and 19 and an integral extension 19', the latter serving as a connecting member and being riveted to the rail 12' as stated. The upper face 20 or head of the T-rail serves as a trackway for the wheels 21 mounted in brackets 22 carried by the door 23. The leg 17' of the T-rail confines the door in position and prevents the displacement of the wheels from their trackway. To this end the upper edge of the door is provided with a Z-bar 25, the upper flange 26 of which extends behind the leg 17' of the member 16. The arrangement is such that while the track wheels 21 will be at all times confined upon the trackway, the door nevertheless can be readily swung to open or closed position. At the same time, the leg 17 coöperating with the flange 26 of the Z-bar effectively prevents any rain or water from passing into the car at the upper edge of the door itself. It is to be further noted that the extension 19' of the T-rail is riveted to the underside of the flange. Accordingly, any moisture or water which strikes the Z-bar 13 will pass out over the flange 12 and the trackway 20, instead of leaking into the interior of the car.

The lower end of the door 23 is provided with a commercial rolled Z-bar 27, the lower flange 28 of which projects into and is confined in position by means of suitable brackets 29, which, however, form no part of the present invention.

As previously stated, I provide a novel form of combined stop and weather guard at the rear end of the door. To this end a flat plate 30 is riveted, as shown at 31, to the central flange of the post 9, but is slightly spaced away from the latter by means of space blocks 32 to form an open-ended and vertically extending channel 33. The space blocks 32 may, if desired, be formed by the rivets 31. The front end 34 of the plate 30 serves as a stop for the adjacent edge of the door when the latter is in closed position. Any rain or moisture which leaks past the joint between the door and stop 34 will pass out through the open-ended channel 33, instead of leaking into the car. The foregoing construction, while simple is nevertheless very effective in forming a weather proof fit at the front end of the door, and at the same time forms a very effective stop. At the opposite edge of the door, means are also provided for preventing any rain or moisture from entering the interior of the car. To this end, to the rear edge of the door is secured a weather guard 35, which takes the form of an angle iron, one flange 36 of which is bolted or otherwise secured, as shown at 37, to the outer face of the door, and the other flange 38 of which projects past the vertical edge of the door, but is spaced away from the latter to form an open-ended channel 39. The weather guard 35 coöperates with a plate member 40, which is riveted or otherwise secured to the central flange of the post 10. The outer edge of this plate 40 terminates in a hook shaped extension 41. When the door is closed, the extension 38' of the flange 38 abuts against this hook-shaped member 41, as shown clearly in Fig. 2. Any moisture which leaks or seeps past the joint between the plate 40 and weather guard 35 will pass out through the open-ended channel 39, and be thus prevented from entering the car.

The invention is not limited to the details of construction shown, except as set forth in the appended claims.

I claim as my invention:

1. The combination with a car body having a door opening, of a door mounted to move across said opening, a post at either end of said opening, said post projecting beyond the side of said car body, and a combined stop and weather guard for one end of said door, comprising a flat metal plate secured to but spaced away from the adjacent face of the post, the outer part of said plate projecting beyond the post to form a door stop and the inner part of said plate forming in conjunction with the adjacent face of the post an open-ended vertical channel.

2. The combination with a car body having a door opening, of a door mounted to move across said opening, a door post at either end of said opening, an angle iron secured to one end of the door, one flange of said angle iron being fastened to the outer face of the door, and the other flange of said angle iron extending across and projecting beyond the adjacent vertical edge of the door but spaced away from the latter, a flat sheet metal plate secured to the outer side of the adjacent stop and terminating at its outer edge in a hook-shaped extension against which the adjacent flange of the said angle iron abuts when the door is in closed position, said angle iron, plate and the adjacent edge of the door forming an open-ended vertical channel.

BELDEN D. JONES.

Witnesses:
 Joyce M. Lutz,
 Mary M. Leppo.